United States Patent Office 2,784,165
Patented Mar. 5, 1957

2,784,165
SYNTHETIC RUBBER AND ROSIN

Louis H. Howland, Watertown, Conn., assignor to United States Rubber Company, New York, N. Y., a corporation of New Jersey No Drawing. Application May 19, 1953,
Serial No. 356,090

16 Claims. (Cl. 260—27)

This invention relates to improving the abrasion resistance of synthetic rubber vulcanizates.

I have found most unexpectedly that the abrasion resistance of synthetic rubber vulcanizates containing conventional amounts of carbon black is greatly improved if there is co-coagulated with the synthetic rubber in the latex state at least 15 parts of rosin acid per 100 parts of synthetic rubber. The synthetic rubber latex is produced by conventional emulsion polymerization of polymerizable synthetic rubber-forming monomers at temperatures from 35° F. to 150° F. in the presence of emulsifiers, catalysts, catalyst-activators, regulators, viscosity reducing electrolytes, buffers, and the like, to the desired conversion of monomers to polymer, which may be between 35 and 100 percent. The temperature of polymerization should not be below 35° F. since below such temperature an anti-freeze must be used, such as methanol and this has a deleterious effect on the properties of the polymer and counteracts any improvement that might be obtained by the rosin acid. For example, incorporating the rosin acid in a synthetic rubber latex polymerized below 35° F. in the presence of methanol does not give an improvement in the abrasion resistance of a vulcanizate made therefrom as compared to a similar vulcanizate made from a similar synthetic rubber polymerized at 35° F. or above, as at the conventional 41°F., without the use of methanol. In fact, the addition of methanol to an emulsion polymerization at 35° F. or above lowers the abrasion resistance of vulcanizates made therefrom.

Since the rosin acid which is co-coagulated with the synthetic rubber softens and improves the processability of the rubber, the viscosity of the synthetic rubber component of the latex, i. e. the viscosity of the synthetic rubber without the softening effect of the 15 to 100 parts of rosin acid per 100 parts of the rubber, should preferably be higher than that of conventional synthetic rubbers which have normal ML-4 Mooney viscosities in the range of 35 to 60. The ML-4 Mooney viscosity of such high viscosity synthetic rubber component of the latex is preferably in the range of 75 to 200. For all practical purposes, the ML-4 Mooney viscosity of the synthetic rubber component of the latex may be considered as the viscosity of the synthetic rubber as it is polymerized, or as it would be if polymerized, in the presence of up to 6 parts of soap or other conventional emulsifying and dispersing agent per 100 parts of polymerizable monomers, such being the conventional amounts of emulsifying agents used in the preparation of synthetic rubbers. The Mooney viscosity measurements referred to above are well known in the rubber industry where they are used as standards of measurement of the viscosity of natural and synthetic rubbers. Mooney viscosity measurements are made on a Mooney shearing disc plastometer or viscometer. This instrument has been described by M. Mooney in Industrial and Engineering Chemistry (Anal. Ed.) 6, 147 (1934). By means of this device, the viscosity of a plastic material in shear may be quantitatively measured. The viscosity readings are based on an arbitrary standard, the lower the readings, the lower the viscosity and hence the greater the plasticity. The Mooney viscosity ranges referred to above and in the claims and the measurements in the examples below are Mooney viscosity readings when measured with the large rotor supplied with the instrument after four minutes between the platens of the instrument at 212° F., not including a one minute warm-up period. This is a standard measurement—A. S. T. M. Standards on Rubber Products—D–927–49 T. Such Mooney viscosity readings are designated as "ML-4" Mooney viscosities, meaning Mooney viscosity (M), using large rotor (L), with four minutes between the platens (4). The temperature is 212° F. unless otherwise designated. As above stated, the normal ML-4 Mooney viscosity for synthetic rubbers is from 35 to 60, such synthetic rubbers being readily processed on conventional rubber processing machinery. The ML-4 Mooney viscosities of synthetic rubber from 75 to 200 are higher than normal and are generally referred to as "high viscosity" synthetic rubbers. It is well known to make these polymers having an ML-4 of 75 to 200 by using smaller amounts of, or eliminating entirely, conventional polymerization modifiers, or by running the polymerization to a higher conversion than is done for a normal Mooney synthetic rubber having an ML-4 of 35 to 60.

The expressions "rosin acid," "a rosin acid," and "rosin acids" are used herein in their generic sense to include the isomeric abietic acid, sapinic acid and d-pimaric acid which occur in varying amounts in wood and gum rosins of different geographical origins, and also the polymerized, hydrogenated, disproportionated and dehydrogenated derivatives of such acids, and also the content of such acids and derivatives in tall oils, disproportionated tall oils and refined tall oils. The rosin acid is conveniently incorporated in the synthetic rubber latex in the form of the water-soluble (alkali-metal, ammonium or amine) salts or so-called soaps, and such soaps may be present in whole or in part in the emulsion of monomers before polymerization to act as emulsifying agent, or part or all of the soap may be added to the synthetic rubber latex after polymerization and before coagulation, as where another emulsifying agent is used, provided that the total quantity of rosin acid in such soap is 15 to 100 parts per 100 parts of synthetic rubber in the latex at the time of coagulation. The latex containing the rosin soap may be coagulated in known manner with acid, such as sulfuric, hydrochloric or acetic acid, alone or together with a monovalent salt such as sodium chloride, in which cases the free rosin acid will be coagulated with the synthetic rubber. The latex containing the rosin soap may also be coagulated in known manner with di- or trivalent metal salts such as zinc sulfate, zinc chloride, aluminum chloride or aluminum sulfate, in which case the rosin acid will be co-coagulated with the synthetic rubber in the form of its water-insoluble polyvalent metal salt which acts, similarly to the free rosin acid, to increase the abrasion resistance of vulcanized carbon-black reinforced compounds made therefrom. The synthetic rubber latex containing the rosin soap may have additional ingredients incorporated in it before coagulation in known manner, e. g. carbon black, clays, vulcanization ingredients, softening oils, and the like.

It is known to use water-soluble soaps of rosin acids as emulsifying agents for the synthetic rubber-forming monomers in synthetic rubber emulsion polymerizations. It is stated in U. S. Patents 2,569,447 and 2,569,448 that synthetic rubbers formed by emulsion polymerization of synthetic rubber-forming monomers in the presence of soaps of rosin acids, such as dehydroabietic, dihydroabietic and tetrahydroabietic acids, and containing as a result thereof up to about 10 percent by weight of polymer, of the rosin acid, exhibit exceptionally high tensile strengths and elongations when compounded and vulcanized. At such levels of rosin acid content from the co-coagulation of the rosin acid with the synthetic rubber, there is a slightly increased but not significantly higher abrasion resistance of vulcanized carbon-black reinforced synthetic rubber compounds. I have found that at a minimum level of about 15 parts of rosin acid per 100 parts of synthetic rubber, and with increased rosin acid loadings to 50 parts and even to 100 parts per 100 parts of the synthetic rubber, there is initiated and maintained a surprising significant increase in abrasion resistance of vulcanized carbon-black reinforced compounds made therefrom.

The polymerizable material in the preparation of the synthetic rubber latex may be one or a mixture of butadienes-1,3, for example, butadiene-1,3, methyl-2-butadiene-1,3 (isoprene), piperylene, 2,3-dimethyl butadiene-1,3. The polymerizable material, as is known, may be a mixture of one or more such butadienes with one or more polymerizable compounds which are capable of forming rubber copolymers with butadienes-1,3; for example, up to 70% of such mixture of one or more compounds which contain a single $CH_2=C<$ group where at least one of the disconnected valences is attached to an electronegative group, that is, a group which substantially increases the electrical dissymmetry or polar character of the molecule. Examples of such monoolefines containing a terminal methylene ($CH_2=C<$) group and are copolymerizable with butadienes-1,3, are aryl olefines, such as styrene, vinyl naphthylene; alpha methyl styrene, para chloro styrene, dichloro styrene, alpha methyl dichloro styrene; the alpha methylene carboxylic acids and their esters, nitriles and amides, such as acrylic acid, methyl acrylate, methyl methacrylate, acrylonitrile, methacrylonitrile, methacrylamide; methyl vinyl ether; methyl vinyl ketone; vinylidine chloride; vinyl pyridine, 2-methyl-5-vinyl pyridine, vinyl carbazole. Such a synthetic rubber latex may generically be termed a "butadiene polymer synthetic rubber latex."

In the laboratory, the abrasion resistance of a given rubber is generally measured by comparing the volume loss with the volume loss from a standard sample under the same conditions. Various types of such machines are described in The Chemistry and Technology of Rubber, by Davis and Blake, pages 824 to 828, on "Abrasion Tests," published by Reinhold Pub. Corp., N. Y., 1937. When synthetic rubber compounds were tested on the majority of types of such abrasion machines, it was found that the Dunlop abrasion machine or so-called Lambourn abrader appears to be the most satisfactory for testing the abrasion resistance of synthetic rubber compounds (Trans. Inst. Rubber Industry, 4, 210). A modified Lambourn abrader as described by J. W. Adams et al. in the article "Abrasion Resistance of GR–S Vulcanizates" in Rubber Chemistry and Technology, 25, 191–208 (April–June 1952) was used in all the abrasion tests referred to herein.

The following is illustrative of the present invention. All parts and percentages referred to herein are by weight.

*Example I*

An emulsion of the following recipe was polymerized at 41° F. to a conversion of about 60% polymerizable monomers to polymer:

| Ingredient: | Parts by weight |
|---|---|
| Butadiene | 71 |
| Styrene | 29 |
| Water | 200 |
| Emulsifier (mixed stearic and oleic acid soap) | 5 |
| Potassium chloride | 0.40 |
| Tertiary dodecyl mercaptan | 0.13 |
| Cumene hydroperoxide | 0.15 |
| Diethylene triamine | 0.12 |
| Sodium salt of naphthalene sulfonic acid condensed with formaldehyde | 0.05 |

After 60% conversion, the polymerization reaction was short-stopped with 0.15 parts of potassium dimethyl dithiocarbamate and residual butadiene and styrene monomers were removed by venting off butadiene and steam distilling at reduced pressure or stripping to remove the residual styrene monomer. The ML–4 Mooney viscosity of the synthetic rubber measured on a sodium chloride and sulfuric acid coagulated and dried sample was 120. To portions of this latex before coagulation was added 5, 10, 15, 20, 25, 50, 75 and 100 parts of disproportionated rosin acid per 100 parts of synthetic rubber in the form of the potassium soap of the rosin acid. In the above formulation, the tertiary dodecyl mercaptan regulator content of 0.13 part was lower than the conventional 0.20 part which is generally used in this recipe to give a rubber of normal viscosity. With the conventional 0.20 part of t-dodecyl mercaptan in another batch of the otherwise same formulation as above, a conventional synthetic rubber of an ML–4 Mooney viscosity of 61 was obtained. This was used as a standard for comparing the abrasion resistances of the portions of the 120 ML–4 Mooney viscosity rubber to which the 5, 10, 15, 20, 25, 50, 75 and 100 parts of disproportionated rosin acid per 100 parts of the synthetic rubber was added before coagulation as above described. In all cases, the coagulant was conventional sodium chloride and sulfuric acid.

In the various abrasion resistance tests referred to herein, the rubber under test and the standard were cured in a conventional carbon black-reinforced tire tread formulation. In testing the above rubbers containing various amounts of rosin acid, the dried standard or control 61 ML–4 Mooney rubber without added rosin, and the dried 120 ML–9 Mooney rubber with 5, 10, 15, 20, 25, 50, 75 and 100% of the rosin acid based on the rubber added to the latex and co-coagulated with the rubber, were compounded on the mill with 40 parts of EPC (easy processing channel) carbon black, 5 parts of zinc oxide, 2 parts of sulfur, and 1.75 parts of mercaptobenzothiazyl disulfide per 100 parts of the rubber or rubber plus rosin acid. Cures were made at 60 and 110 minutes at 292° F. The abrasion resistances of the above compounded 120 ML–4 Mooney viscosity rubber containing 5, 10, 15, 20, 25, 50, 75 and 100 parts of the disproportionated rosin acid per 100 parts of the rubber were 109, 111, 145, 151, 149, 158, 142 and 134, respectively, compared to 100 for the standard rubber compound. It is only at about 15 parts rosin acid content (based on 100 parts of rubber) that there is a significant increase in abrasion resistance, and such surprising increase is maintained even up to 100 parts of rosin acid loading per 100 parts of rubber.

*Example II*

As illustrated in this example, the synthetic rubber latex containing the 15 to 100% of rosin acid based on the rubber may be polymerized in the presence of the rosin acid instead of being admixed with the rosin acid after polymerization to give the increased abrasion resistance according to the present invention.

An emulsion of the following recipe was polymerized at 41° F. to a conversion of about 60%:

| Ingredient: | Parts by weight |
|---|---|
| Butadiene | 71 |
| Styrene | 29 |
| Water | 200 |
| Potassium salt of disproportionated rosin acid | 25 |
| Sodium salt of naphthalene sulfonic acid condensed with formaldehyde | 0.10 |
| Trisodium phosphate | 0.30 |
| Cumene hydroperoxide | 0.12 |
| Ferrous sulfate heptahydrate | 0.20 |
| Potassium pyrophosphate | 0.22 |
| Mixed tertiary ($C_{12}$ to $C_{16}$) mercaptans | 0.15 |

After 60% conversion, the polymerization reaction was short-stopped with 0.23 part of dinitrochlorobenzene, residual butadiene and styrene monomers were vented and stripped off, and the latex was coagulated with sodium chloride and sulfuric acid. The ML-4 Mooney viscosity of the coagulated rubber was 64. The same recipe with 4 parts instead of 25 parts of the potassium salt of the rosin acid per 100 parts of charged monomers as emulsifying agent would produce a rubber having an ML-4 Mooney viscosity of 90–100. The standard was a rubber polymerized in the same manner and the same recipe except the potassium salt of disproportionated rosin acid was reduced to 4 parts and the mixed tertiary mercaptan regulator was increased to 0.21 part, giving a rubber having an ML-4 Mooney viscosity of 55, which was more nearly equivalent to the 64 ML-4 Mooney viscosity of the rubber containing the rosin acid from the 25 parts of the rosin soap. The rubbers were compounded with 40 parts of EPC carbon black, 5 parts of zinc oxide, 1.5 parts of stearic acid, 2 parts of sulfur, and 3 parts of mercaptobenzothiazyl disulfide per 100 parts of the rubber plus rosin acid, and cured at 292° F. The abrasion resistance of the cured rubber containing the rosin acid from the 25 parts of potassium salt of disproportionated rosin acid was 150 as compared to 100 for the standard containing the rosin acid from the 4 parts of potassium salt of disproportionated rosin acid.

*Example III*

As illustrated in this example, the carbon black may be incorporated into the latex rosin acid soap mixture and co-coagulated therewith.

The synthetic rubber latex used in this example was prepared according to the recipe of Example II but with 4 parts of potassium soap of disproportionated rosin acid as the emulsifier and 0.16 part of mixed tertiary mercaptans as the regulator. To a portion of the latex was added 25 parts of disproportionated rosin acid and 1 part of tallow acid, both as the sodium salts, per 100 parts of rubber of the latex. A carbon black dispersion was prepared by pulverizing pelleted HAF (high abrasion furnace) carbon black and dispersing it in 396.9 parts of water, 2.8 parts of partially desulfonated sodium lignin sulfonate dispersing agent and 0.3 part of sodium hydroxide per 100 parts of the carbon black. The carbon black dispersion was then added to both the latex containing only the 4 parts of rosin acid soap emulsifier and to the latex containing the additional 25 parts of salt of rosin acid and 1 part of salt of fatty acid, in amount to give 55 parts of carbon black per 100 parts of rubber plus acid (solids on coagulation). The latices containing the carbon black were coagulated with sodium chloride and sulfuric acid, and dried to give so-called rubber-carbon black masterbatches. These masterbatches were compounded in conventional tire tread formulations with small amounts of zinc oxide, sulfur and mercaptobenzothiazyl disulfide accelerator, and vulcanized at 292° F. Abrasion tests showed an abrasion resistance of 173 for the compound prepared from the latex to which the 25 parts of rosin acid salt was added, as compared with an abrasion resistance of 100 for the standard prepared from the latex containing only the 4 parts of rosin acid soap emulsifier. The carbon black is generally 20 to 100 parts per 100 parts of the synthetic rubber in conventional compounding, and such carbon black may be compounded with the coagulated and dried synthetic rubber, or added to the synthetic rubber latex before coagulating to form a master batch as illustrated in this example.

*Example IV*

As illustrated in this example, the coagulant may be a polyvalent metal salt, instead of an acid coagulant, and yet the advantages of the present invention are retained.

The synthetic rubber latex used in this example was prepared according to the recipe of Example II but with 4 parts of potassium soap of disproportionated rosin acid as the emulsifier for the monomers and 0.16 part of mixed tertiary mercaptans as the regulator. A portion of this latex was coagulated with sodium chloride and sulfuric acid. To another portion of the latex was added 25 parts of disproportionated rosin acid and 1 part of tallow acid, both as sodium salts, (based on 100 parts of rubber of the latex). This portion was then coagulated with zinc sulfate. The two coagula, the first being the standard, were dried and compounded in a conventional tire tread recipe with 55 parts of HAF carbon black per 100 parts of rubber plus acid content, together with small amounts of zinc oxide, sulfur, and mercaptobenzothiazyl disulfide. The compounded rubbers were vulcanized at 292° F. and tested for abrasion resistance. The compound from the latex containing the added 25 parts of rosin acid soap coagulated with zinc sulfate gave an abrasion resistance of 162, as compared with 100 for the standard compound from the latex containing only the 4 parts of rosin acid soap coagulated with sodium chloride and sulfuric acid.

*Example V*

This, and the following example, illustrates the use of various rosin acids according to the present invention.

To portions of a synthetic rubber latex prepared according to the recipe of Example I, were added 25 and 33 parts of dimerized rosin acid per 100 parts of synthetic rubber in the form of the sodium soap of the rosin acid. The portions were coagulated with sodium chloride and sulfuric acid, and compounded in a tire tread recipe and vulcanized similarly to Example I. Abrasion resistance tests were made on these vulcanized tire tread recipes with a similar vulcanized tire tread recipe from the same standard as used in Example I.

The abrasion rating of the compounds made with 25 and 33 parts of dimerized rosin and per 100 parts of the synthetic rubber in each case was 136, as compared with 100 for the standard compound.

*Example VI*

To portions of a synthetic rubber latex prepared according to the recipe of Example I, were added 25 parts of abietic acid and 25 parts of dehydroabietic acid (dehydrogenatec rosin acid) per 100 parts of synthetic rubber in the form of the sodium soaps of the rosin acids. The portions were coagulated with sodium chloride and sulfuric acid, and compounded in a tire tread recipe and vulcanized similarly to Example I. Abrasion resistance tests were made on these vulcanized tire tread recipes with a similar vulcanized tire tread recipe from a standard prepared in the same manner as the standard used in Example I, which in this case had an ML-4 Mooney viscosity of 57 for the raw polymer.

The abrasion rating of the compound made with 25 parts of abietic acid per 100 parts of the synthetic rubber was 138, and the abrasion rating of the compound made with 25 parts of dehydroabietic acid per 100 parts of the synthetic rubber was 150, as compared with 100 for the standard compound.

This application is a continuation-in-part of application Serial No. 294,928, filed June 21, 1952, now abandoned.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. The coagulum of a synthetic rubber latex composition containing a water-soluble soap of a rosin acid, the rosin acid equivalent of the soap content of the latex being in amount from 15 to 100 parts per 100 parts of the synthetic rubber, the liquid phase of the latex consisting essentially of water, said latex being polymerized at 35° F. to 150° F. and comprising an aqueous emulsion polymerizate of material selected from the group consisting of butadienes-1,3 and mixtures of butadienes-1,3 with compounds which contain a single $CH_2=C<$ group and are copolymerizable with butadienes-1,3.

2. The product of claim 1 in which the synthetic rubber component of the latex composition is a butadiene-styrene copolymer having an ML-4 Mooney viscosity in the range of 75 to 200.

3. The coagulum of a synthetic rubber latex composition containing a water-soluble soap of a rosin acid and dispersed carbon black, the rosin acid equivalent of the soap content of the latex being in amount from 15 to 100 parts per 100 parts of the synthetic rubber and the carbon black content of the latex being 20 to 100 parts per 100 parts of the synthetic rubber, the liquid phase of the latex consisting essentially of water, said latex being polymerized at 35° F. to 150° F. and comprising an aqueous emulsion polymerizate of material selected from the group consisting of butadienes-1,3 and mixtures of butadienes-1,3 with compounds which contain a single $CH_2=C<$ group and are copolymerizable with butadienes-1,3.

4. The product of claim 3 in which the synthetic rubber component of the latex composition is a butadiene-styrene copolymer having an ML-4 Mooney viscosity in the range of 75 to 200.

5. A vulcanized synthetic rubber composition comprising 15 to 100 parts of rosin acid equivalent of material selected from the group consisting of rosin acids and water-insoluble polyvalent metal salts of rosin acids per 100 parts of synthetic rubber and 20 to 100 parts of carbon black per 100 parts of synthetic rubber, said material of the group consisting of rosin acids and water-insoluble polyvalent metal salts of rosin acids being co-coagulated with the synthetic rubber from a synthetic rubber latex, the liquid phase of the latex consisting essentially of water, and said synthetic rubber latex being polymerized at 35° F. to 150° F. and comprising an aqueous emulsion polymerizate of material selected from the group consisting of butadienes-1,3 and mixtures of butadienes-1,3 with compounds which contain a single $CH_2=C<$ group and are copolymerizable with butadienes-1,3.

6. The product of claim 5 in which the synthetic rubber component of the latex composition is a butadiene-styrene copolymer having an ML-4 Mooney viscosity in the range of 75 to 200.

7. A vulcanized synthetic rubber composition comprising 15 to 100 parts of rosin acid equivalent of material selected from the group consisting of rosin acids and water-insoluble polyvalent metal salts of rosin acids per 100 parts of synthetic rubber and 20 to 100 parts of carbon black per 100 parts of synthetic rubber, said material of the group consisting of rosin acids and water-insoluble polyvalent metal salts of rosin acids and said carbon black being co-coagulated with the synthetic rubber from a synthetic rubber latex and containing the carbon black, the liquid phase of the latex consisting essentially of water, and said synthetic rubber latex being polymerized at 35° F. to 150° F. and comprising an aqueous emulsion polymerizate of material selected from the group consisting of butadienes-1,3 and mixtures of butadienes-1,3 with compounds which contain a single $CH_2=C<$ group and are copolymerizable with butadienes-1,3.

8. The product of claim 7 in which the synthetic rubber component of the latex composition is a butadiene-styrene copolymer having an ML-4 Mooney viscosity in the range of 75 to 200.

9. A vulcanized synthetic rubber composition comprising 15 to 100 parts of rosin acid per 100 parts of synthetic rubber and 20 to 100 parts of carbon black per 100 parts of synthetic rubber, said rosin acid being co-coagulated with the synthetic rubber from a synthetic rubber latex composition containing an alkali soap of rosin acid, the liquid phase of the latex consisting essentially of water, and said synthetic rubber latex being polymerized at 35° F. to 150° F. and comprising an aqueous emulsion polymerizate of material selected from the group consisting of butadienes-1,3 and mixtures of butadienes-1,3 with compounds which contain a single $CH_2=C<$ group and are copolymerizable with butadienes-1,3.

10. The product of claim 9 in which the synthetic rubber component of the latex composition is a butadiene-styrene copolymer having an ML-4 Mooney viscosity in the range of 75 to 200.

11. A vulcanized synthetic rubber composition comprising 15 to 100 parts of rosin acid per 100 parts of synthetic rubber and 20 to 100 parts of carbon black per 100 parts of synthetic rubber, said rosin acid and said carbon black being co-coagulated with the synthetic rubber from a synthetic rubber latex composition containing an alkali soap of rosin acid and the carbon black, the liquid phase of the latex consisting essentially of water, and said synthetic rubber latex being polymerized at 35° F. to 150° F. and comprising an aqueous emulsion polymerizate of material selected from the group consisting of butadienes-1,3 and mixtures of butadienes-1,3 with compounds which contain a single $CH_2=C<$ group and are copolymerizable with butadienes-1,3.

12. The product of claim 11 in which the synthetic rubber component of the latex composition is a butadiene-styrene copolymer having an ML-4 Mooney viscosity in the range of 75 to 200.

13. The method of preparing a synthetic rubber composition which comprises polymerizing at 35° F. to 150° F. an aqueous emulsion of synthetic rubber forming monomers selected from the group consisting of butadienes-1,3 and mixtures of butadienes-1,3 with compounds which contain a single $CH_2=C<$ group and are copolymerizable with butadienes-1,3 containing up to 6 parts of emulsifying agent per 100 parts of polymerizable monomers, the liquid phase of the emulsion consisting essentially of water, adding to the synthetic rubber latex product a water-soluble soap of a rosin acid in amount to give a total rosin acid equivalent in the latex of 15 to 100 parts per 100 parts of synthetic rubber in the latex, and coagulating the latex and rosin soap mixture.

14. The method of preparing a synthetic rubber composition which comprises polymerizing at 35° F. to 150° F. an aqueous emulsion of a major proportion of butadiene and a minor proportion of styrene containing up to 6 parts of emulsifying agent per 100 parts of polymerizable monomers, the liquid phase of the emulsion consisting essentially of water, adding to the synthetic rubber latex product a water-soluble soap of a rosin acid in amount to give a total rosin acid equivalent in the latex of 15 to 100 parts per 100 parts of synthetic rubber in the latex, and coagulating the latex and rosin soap mixture.

15. The method of preparing a synthetic rubber composition which comprises polymerizing at 35° F. to 150° F. an aqueous emulsion of synthetic rubber-forming monomers selected from the group consisting of butadienes-1,3 and mixtures of butadienes-1,3 with compounds which contain a single $CH_2=C<$ group and are copolymerizable with butadienes-1,3 containing up to 6 parts of emulsifying agent per 100 parts of polymerizable monomers, the liquid phase of the emulsion consisting essentially of water, adding to the synthetic rubber latex product a water-soluble soap of a rosin acid in amount to give a total rosin acid equivalent in the latex of 15 to 100 parts per 100 parts of synthetic rubber in the latex and 20 to 100 parts of aqueous dispersed carbon black per 100 parts of synthetic rubber in the latex, and coagulating the latex and rosin soap and carbon black mixture.

16. The method of preparing a synthetic rubber composition which comprises polymerizing at 35° F. to 150°

F. an aqueous emulsion of a major proportion of butadiene-1,3 and a minor proportion of styrene containing up to 6 parts of emulsifying agent per 100 parts of polymerizable monomers, the liquid phase of the emulsion consisting essentially of water, adding to the synthetic rubber latex product a water-soluble soap of a rosin acid in amount to give a total rosin acid equivalent in the latex of 15 to 100 parts per 100 parts of synthetic rubber in the latex and 20 to 100 parts of aqueous dispersed carbon black per 100 parts of synthetic rubber in the latex, and coagulating the latex and rosin soap and carbon black mixture.

References Cited in the file of this patent

UNITED STATES PATENTS

| | | |
|---|---|---|
| 2,512,697 | Te Grotenhuis | June 27, 1950 |

FOREIGN PATENTS

| | | |
|---|---|---|
| 472,810 | Canada | Apr. 10, 1951 |

OTHER REFERENCES

Howland et al.: Ind. and Eng. Chem., vol. 45, No. 5, May 1953, pp. 1053–1059.